(No Model.)
T. KEYS.
ODOR CONSUMER FOR STOVES.
No. 244,906. Patented July 26, 1881.
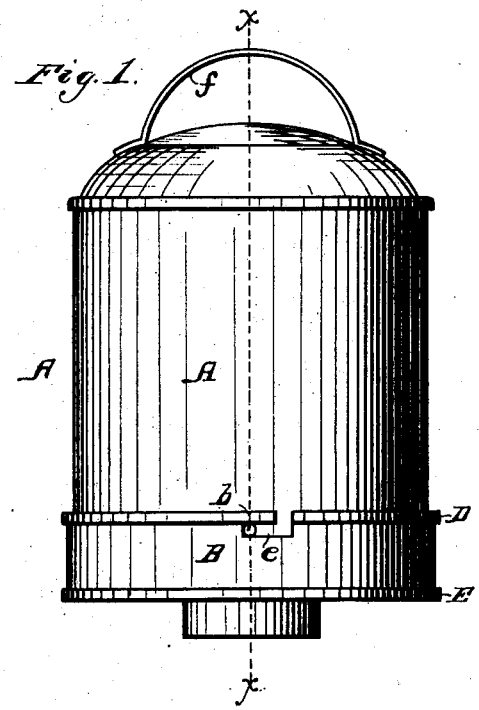
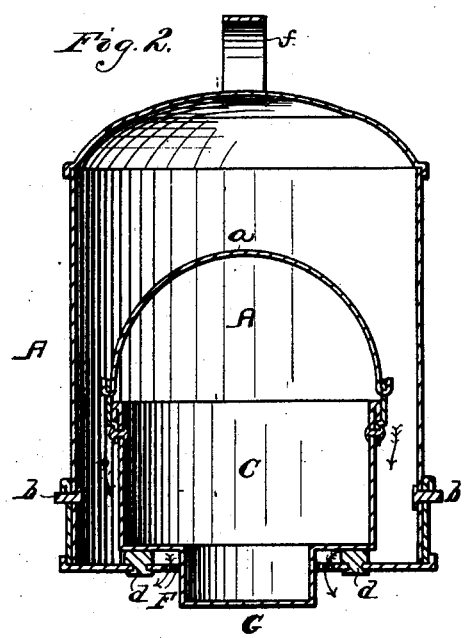
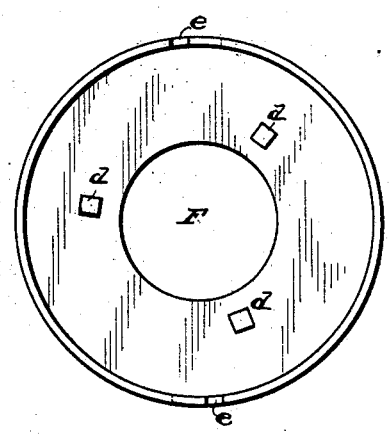
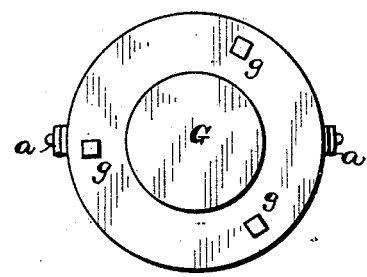
Witnesses,
Henry Frankfurter,
Frank Johnson.
Inventor,
Thomas Keys
per
H. Harrison
Attorney.

United States Patent Office.

THOMAS KEYS, OF CHICAGO, ILLINOIS.

ODOR-CONSUMER FOR STOVES.

SPECIFICATION forming part of Letters Patent No. 244,906, dated July 26, 1881.

Application filed May 16, 1881. (No model.)

*To all whom it may concern:*

Be it known that I, THOMAS KEYS, a citizen of the United States, residing at Chicago, in the county of Cook and State of Illinois, have invented a new and useful Improvement in Odor-Consumers for Stoves, of which the following is a specification.

The object of my invention is to furnish a device whereby the odors arising from the cooking of vegetables and other substances will be conveyed into the fire and consumed without passing into the air, and also for the consumption of steam arising from kettles and vessels used in heating and cooking purposes. I attain these objects by the construction, arrangement, and combination of the several parts, as illustrated in the accompanying drawings, in which—

Figure 1 is a side elevation of my invention. Fig. 2 is a section on the line $x\ x$ of Fig. 1. Fig. 3 is an inside top view of base flue-plate. Fig. 4 is a bottom view of kettle or heating-vessel.

Similar letters refer to similar parts throughout the several views.

A is a case or cover, made of tin or any suitable material, and made in a cylindrical shape or of any suitable form desired. It is entirely open at the bottom and closed at the top, and is provided with a handle, $f$, rigidly attached to the top for the purpose of lifting. The case A is also provided with pins $b$ on the side toward its lower end, which fit or catch in the slots $e$ of the base flue-plate B. The bottom of the case A rests on the bottom E of the base flue-plate.

B is what I call a "base flue-plate," and is made of two pieces or cast in one piece. Its bottom E is cast with a hole, F, in its center, the hole F being of the size of the stove-hole upon which the vessel rests. On the upper face of base-plate E, and cast with it, are small lugs or projections $d\ d$, as shown in Fig. 3. The kettle C rests upon these lugs $d\ d$, whereby a space or flue is made for the passage of the odor into the fire.

C is a kettle or vessel for cooking or heating purposes, and is provided with a bottom, G, and handle $a$, all made as ordinary vessels for similar purposes.

The body-bottom of kettle C may be provided with lugs $g\ g$, in the event that the base flue-plate B is dispensed with. The said lugs $g\ g$, with the case A, will form a passage or flue for the odors to pass into the fire and be consumed.

The manner of operation is as follows: The base flue-plate B is placed on the stove or oven. The kettle C is placed on plate B. The main bottom of the kettle C will rest upon the lugs $d\ d$, and while the bottom G will project down into the fire, by reason of the lugs a space or flue will be left for the passage of the odors, as shown in Fig. 2. The kettle C is then filled with vegetables, meats, liquids, or other material to be cooked or heated. The case or cover A is placed over the kettle, the pins $b\ b$ being fastened in the slots $e$, whereby an air-chamber is formed. When the heat is applied to the kettle the odor or steam will ascend and, having no outlet at the top, will pass down through the flue or passage formed by the lugs into the fire and be consumed, the direction and operation of the same being shown as indicated by the arrows in Fig. 2, and the odors will not be allowed to pass into the room and be offensive, as now is the case. By simply taking hold of the handle $f$ the entire device can be lifted from the stove and the case removed, and the kettle or vessel can be taken out. If the base flue-plate B is hot it need not be touched, but can be removed or replaced at will by simply attaching the cover A and lifting by the handle $f$. In the event it is desired not to use the base flue-plate B the kettle C, provided with the lugs $g\ g$, is used, and the cover A is simply placed over the kettle. The lugs $g$ will form a flue or passage for the odors into the fire.

I do not desire to be confined to the exact shape as shown in the drawings; but the form may be varied, the essential feature being the formation of a flue for the passage of odors into the fire by the combination of a case, kettle, and flue-plate.

What I claim as new and original, and desire to secure by Letters Patent, is—

1. In an odor-consuming device, the base flue-plate B, having slot $e$ and bottom plate, E, provided with opening F and lugs $d\ d$, in combination with kettle C, all incased with cover A, whereby a flue is formed and the odors consumed, substantially as described and shown.

2. In an odor-consuming device, the combination of the case or cover A, provided with handle $f$ and pins $b$, the base flue-plate B, having slots $e$, bottom plate, E, provided with opening F and lugs $d$ $d$, and the kettle C, provided with handles $a$ and bottom G, all substantially as described and shown, and for the purposes set forth.

THOMAS KEYS.

Witnesses:
 FRANK JOHNSON,
 J. TAYLOR HAIR.